United States Patent
Desai et al.

(10) Patent No.: US 8,429,359 B1
(45) Date of Patent: Apr. 23, 2013

(54) METHOD AND APPARATUS FOR DYNAMICALLY BACKING UP DATABASE FILES

(75) Inventors: Milin Desai, Sunnyvale, CA (US); Michael Payne, Archer, FL (US)

(73) Assignee: Symantec Operating Corporation, Mountain View, CA (US)

( * ) Notice: Subject to any disclaimer, the term of this patent is extended or adjusted under 35 U.S.C. 154(b) by 1494 days.

(21) Appl. No.: 11/026,656

(22) Filed: Dec. 31, 2004

(51) Int. Cl.
*G06F 12/16* (2006.01)

(52) U.S. Cl.
USPC .................... 711/162; 711/E12.103

(58) Field of Classification Search .................. None
See application file for complete search history.

(56) References Cited

U.S. PATENT DOCUMENTS

| | | | | |
|---|---|---|---|---|
| 5,758,359 | A * | 5/1998 | Saxon | 707/204 |
| 6,615,365 | B1 * | 9/2003 | Jenevein et al. | 714/6 |
| 7,269,701 | B2 * | 9/2007 | Shackelford et al. | 711/162 |
| 2003/0177306 | A1 * | 9/2003 | Cochran et al. | 711/114 |
| 2003/0220935 | A1 * | 11/2003 | Vivian et al. | 707/102 |

OTHER PUBLICATIONS

Qian et al., "Optimal Backup Policies for a Database System with Incremental Backup", 2002, Electronics and Communications in Japan, Part 3, vol. 85, No. 4, pp. 1-9.*
Ken Mort, "Re: [SQL] 8K limit . . .", 1999, https://svr5.postgresql.org/pgsql-sq1/1999-02/msg00192.php.*
Thomas Sullivan, "Microsoft Enhances SQL Server 2000 Core Storage Engine—Product Announcement", 2000, https://findarticles.com/p/articles/mi_m0FOX/is_7_5/ai_62213789/print.*

* cited by examiner

*Primary Examiner* — Edward Dudek, Jr.
*Assistant Examiner* — Ralph A Verderamo, III
(74) *Attorney, Agent, or Firm* — Campbell Stephenson LLP

(57) ABSTRACT

A method and apparatus for backing up a storage system, e.g., one or more disk drives. In one embodiment, an apparatus utilizes a volume snapshot service (VSS) to create a snapshot image file of a computer's storage system and then subsequently reads the data blocks contained in the snapshot image file. A determination of the number of modified data blocks, i.e., the data blocks that have changed since a last backup operation, is made. The apparatus estimates a backup size from the number of modified data blocks and subsequently determines if the estimated backup size exceeds a predetermined threshold. In the event the predetermined threshold is exceeded, a backup operation is conducted.

22 Claims, 3 Drawing Sheets

METHOD AND APPARATUS FOR DYNAMICALLY BACKING UP DATABASE FILES

BACKGROUND OF THE INVENTION

1. Field of the Invention

Embodiments of the present invention generally relate to backup storage systems, and more particularly, to a method and apparatus for dynamically backing up database files within a backup storage system.

2. Description of the Related Art

Traditionally, data on a Structured Query Language (SQL) server is backed up to a backup server for the purpose of preserving data in order to prevent data loss in the event of a server failure. These backup operations are typically conducted on a periodic, time dependent basis. Although periodic backup procedures serve as a fairly effective precaution, these scheduled backups are not without their drawbacks. For example, if the database scheduled to be backed up was insignificantly modified (or not at all), a waste of system resources would result in the event of an occurrence of a scheduled backup. Conversely, if a considerable quantity of data is required to be backed up, the backup process can take a substantial amount of time, thus expanding the window of time in which data on a SQL server is vulnerable to a possible system crash.

In addition to these disadvantages, a computing system may be exposed to a higher probability of data loss in the event of a server failure when the system is subject to periodic, time dependent backup procedures. More specifically, this approach to backing up data is not dynamically responsive to modifications made to existing database files. One critical drawback typically associated with scheduled, periodic backup operations is that the "point in time" in which sizeable database files are modified is not taken into consideration. For instance, if a significant amount of data is modified (or initially stored), this data will not be backed up until the next incremental backup operation for that particular storage system is scheduled. Thus, the possibility exists for a system crash to occur before the next incremental backup operation is executed. Naturally, this undesirable scenario would inevitably lead to the loss of a considerable amount of data.

Therefore, there is a need in the art for a method and apparatus for dynamically backing up database files. By utilizing a proactive, time-independent backup system, databases and other data can be backed up in a manner that is less vulnerable to an unexpected system crash.

SUMMARY OF THE INVENTION

The invention provides a method and apparatus for backing up storage system, e.g., one or more disk drives. In one embodiment, an apparatus utilizes a volume snapshot service (VSS) to create a snapshot image file of a computer's storage system and then subsequently reads the data blocks contained in the snapshot image file. A determination of the number of modified data blocks, i.e., the data blocks that have changed since a last backup operation, is made. The apparatus estimates a backup size from the number of modified data blocks and subsequently determines if the estimated backup size exceeds a predetermined threshold. In the event the predetermined threshold is exceeded, a backup operation is conducted.

BRIEF DESCRIPTION OF THE DRAWINGS

The following detailed description makes reference to the accompanying drawings which are now briefly described.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
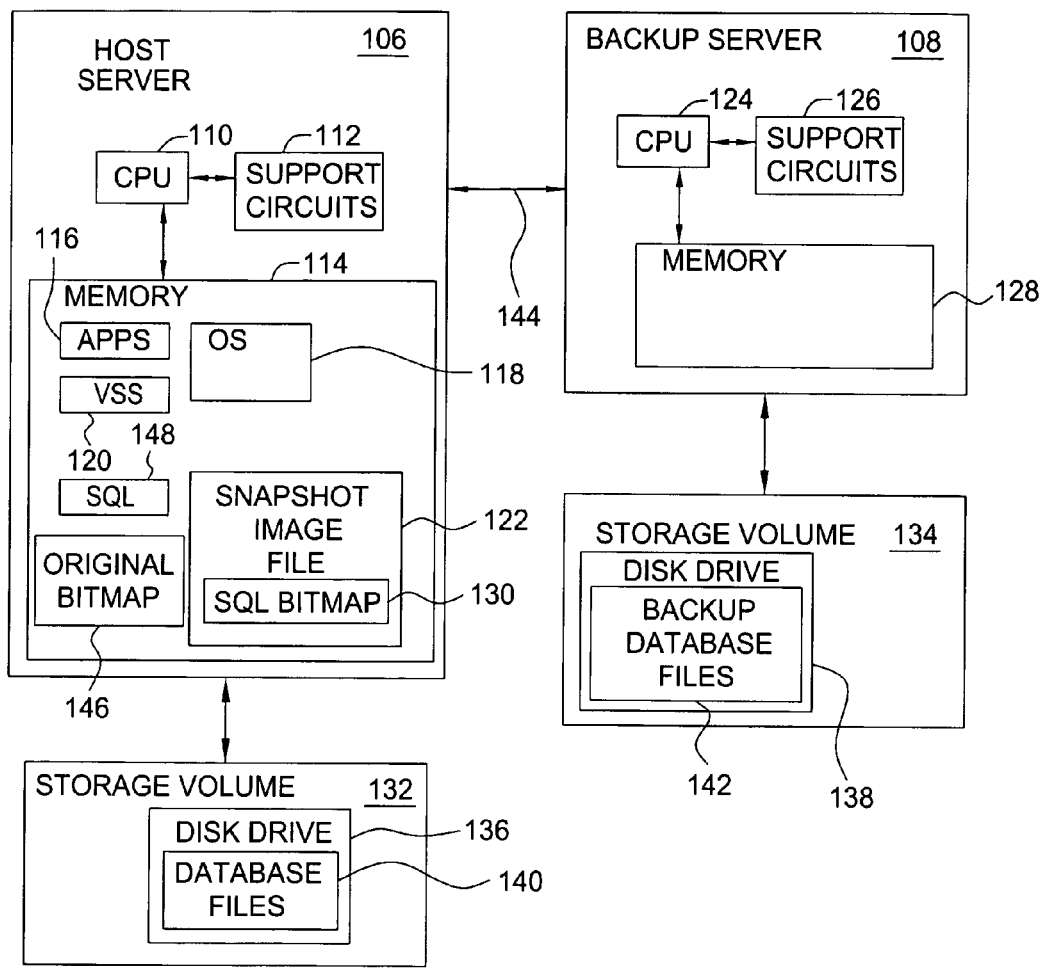
FIG. 1 depicts a block diagram of a database backup storage system that operates in accordance with the present invention.

FIG. 1 depicts a storage system 100 in which the embodiments of the present invention may be utilized. This figure only portrays one variation of the myriad of possible system configurations that may benefit from use of the present invention. For example, FIG. 1 could have depicted numerous host servers 106, numerous backup servers 108, and a plurality of storage volumes 132, 134. For simplicity and clarity, only one host server 106 with one storage volume 132 and one backup server 108 with one backup storage volume 134 are depicted and described. The invention, as shall be discussed below, is a method and apparatus for dynamically backing up host server database files to the backup server.

The storage system 100 comprises a host server 106, i.e., a Structured Query Language (SQL) server, coupled to a backup server 108 via a communication link 144. The host server 106 and backup server 108 are connected to a storage volume 132 and a backup storage volume 134, respectively. Each storage volume 132, 134 respectively comprises at least one disk drive 136, 138.

The host server 106 comprises at least one central processing unit 110, support circuits 112, and memory 114. The CPU 110 may comprise one or more conventionally available microprocessors. The support circuits 112 are well known circuits used to promote functionality of the CPU 110. Such circuits include but are not limited to a cache, power supplies, clock circuits, input/output (I/O) circuits, and the like.

The memory 114 is coupled to the CPU 110 and may comprise random access memory, read only memory, removable disk memory, flash memory, and various combinations of these types of memory. The memory 114 is sometimes referred to as main memory and may, in part, be used as cache memory or buffer memory. The memory 114 generally stores the operating system 118 of the host server 106 and various forms of application software 116. The operating system 118 may be one of a number of commercially available operating systems such as, but not limited to, SOLARIS from SUN Microsystems, Inc., AIX from IBM Inc., HP-UX from Hewlett Packard Corporation, LINUX from Red Hat Software, WINDOWS 2003 from Microsoft Corporation, and the like. In one embodiment, the operating system 118 is responsible for maintaining an original bitmap file 146 in the memory 114. The original bitmap 146 represents the data blocks that comprise the database files 140 in the storage volume 132 since the last snapshot or backup operation.

The memory 114 contains a volume snapshot service (VSS) software 120. At the start of the backup operation, the VSS software 120 is executed by the operating system to take an exact point-in-time snapshot of all the volumes in the at least one disk drive 136 to be backed up. The VSS 120 can be any type of service that takes snapshots of disks and volumes, such as the Volume Snapshot Service provided in MICROSOFT WINDOWS 2003. The VSS 120 can be used to gain READ access to database files 140 that are normally not accessible. Generally, to prevent error and corruption of an SQL database, only the SQL software can access and alter SQL database files. To ensure the integrity of a database, SQL opens the database without permitting sharing. As such, access to the database while it is in use in generally impossible. However, VSS accesses the database at the filter driver level which facilitates READ access to the database files at any time.

The memory 114 also contains a snapshot image file 122. This snapshot image file 122, taken by the VSS 120, is an image of a particular disk drive or drives 136 in the host server's storage volume 132. Upon taking this snapshot image file 122, READ access to the database files 140 is obtained. This READ access enables the invention to ultimately determine if the size of the data to be backed up necessitates a backup procedure. The snapshot image file 122 taken by VSS 120 contains an SQL bitmap 130. The SQL bitmap 130 provides a representation of the data blocks comprising the database files 140 presently stored in the disk drive 136. The memory also contains SQL software 148. SQL software 148 facilitates the use of a computer query language that, among other things, enables the host server 106 to request information from database files 140.

As mentioned above, the host server 106 is coupled to a storage volume 132. The storage volume 132 generally comprises one or more disk drives 136, or disk drive arrays, that are used as a mass storage device for the host server 106. The disk drives 136 within the storage volume 132 typically contain the original versions of the database files 140 that need to be backed up. For simplicity and clarity, only one disk drive 136 containing database files 140 is depicted.

The backup server 108 is configured in a similar manner to the host server 106. Specifically, the backup server 108 comprises a CPU 124, support circuits 126, and memory 128. The memory 128 stores all of the information that is supplied as backup information from the host server 106. The backup server 108 and the host server 106 are typically coupled by a private network connection 144 that facilitates the rapid transfer of backup information and restoration of this information when necessary. However, in other embodiments, the host server 106 and the backup server 108 may be connected through a network or some other communications means that is known in the art.

The backup server 108 is coupled to a backup storage volume 134 containing at least one disk drive 138 for storing backup database files 142. This backup storage volume 134, like the host storage volume 132, typically comprises one or more disk drives 138 that are used as a mass storage device. The backup database files 142 stored within the disk drives 138 may include copies of the original database files 140 that are stored in the host storage volume 132. For simplicity and clarity, only one disk drive 138 containing backup database files 142 is shown in FIG. 1.

Figure 2:
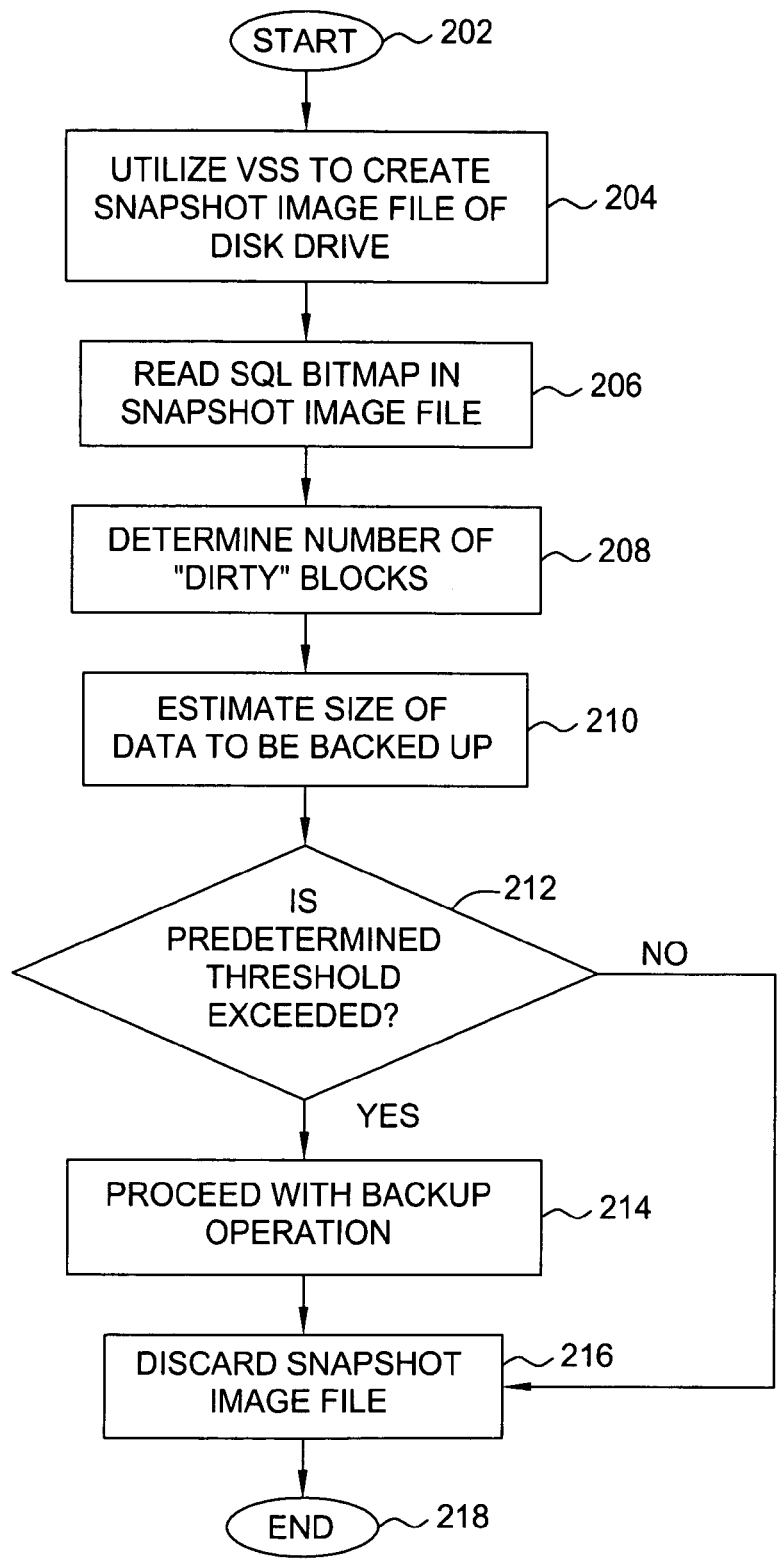
FIG. 2 depicts a flow diagram of a method for backing up a storage system that operates in accordance with the present invention.

FIG. 2 depicts a flow diagram of a method 200 executed by one embodiment of the present invention. The method 200 commences at step 202 and proceeds to step 204, where the VSS 120 is utilized to create a snapshot image file 122 of a computer's disk drive 136. By creating a snapshot image file 122 of the disk drive 136, READ access to exact copies of the database files 140 stored on the disk drive 136 is obtained. Furthermore, the invention can be configured to have the VSS 120 take a snapshot image file 136 in accordance with a predetermined periodic schedule at any desired rate (i.e., ranging from a few seconds to several days). When VSS 120 produces a snapshot for the purpose of determining the degree of database change in accordance with the present invention, the snapshot is created without SQL database activity. If a snapshot is being created for backup or archive purposes, the running applications are informed of a pending snapshot process, the applications quiesce their data, SQL delays write operations to the database, and so on. All these activities are performed to ensure that the data is in a consistent state prior to performing a snapshot for backup or archive purposes. These activities result in the use of substantial system overhead.

Conversely, the inventive procedure does not require the establishment of consistent data before performing a snapshot for purposes of determining the degree of data base change. The snapshot that is created for change determination purposes is created without notifying the running applications, without suspending SQL write operations and without consuming overhead usually associated with performing snapshot generation. Because this operation is a low overhead procedure, the VSS 120 is able perform this operation with greater frequency as opposed to a conventional backup or snapshot image (i.e., for the purpose of a backup) process.

At step 206, the SQL bitmap 130 in the snapshot image file 122 is read. At step 208, a determination of the number of "dirty" blocks is made. Dirty blocks are data blocks that have been modified or changed since the last completed backup operation. In one embodiment, the number of dirty blocks is determined by comparing the SQL bitmap 130 and the original bitmap file 146. The SQL bitmap 130 reflects the data blocks comprising the database files 140 as they currently exist in disk drive 136. The original bitmap file 146 represents the data blocks from the last completed backup operation. By comparing the difference between the two bitmaps 130, 146, an accurate count of dissimilar (i.e., dirty) data blocks in the SQL bitmap 130 can be ascertained.

At step 210, an estimation of the size of data needed to be backed up is made. In one embodiment, the dirty blocks ascertained from step 208 are added together and the sum is subsequently multiplied by 8192 in order to obtain an accurate estimate of the data needed to be backed up. The number 8192 is a conversion factor that represents the number of bytes that exist in a data block read by SQL 148 (i.e., SQL block sizes are 8 kB). At step 212, an inquiry is made as to whether a predetermined "data size" threshold is exceeded by the estimated size of the data calculated in step 210. This predetermined threshold can be set to any value as considered appropriate by an IT administrator, operator, or other user. Alternatively, the threshold may be automatically established by software. Furthermore, the threshold could be dynamically adjusted based upon historical information regarding database changes or other factors that may impact the desired frequency of backups. If the estimated size of data does not surpass the predetermined threshold, the method 200 proceeds to step 216. If the estimated size of data does exceed the predetermined threshold, the method continues to step 214.

At step 214, a backup operation is triggered since the invention has determined that a sufficient number of data blocks have changed in order to necessitate a backup. This backup operation can be any type of backup procedure that is known in the art. In addition, the bitmap file 146 kept by the operating system 118 is replaced and updated to reflect the changed data blocks of the volumes in the disk drive 136. At step 216, the original snapshot image file 122 obtained in step 204 is discarded. In one embodiment, the original snapshot image file 122 may be discarded as early as after step 206. The method 200 then continues to step 218 and ends.

Figure 3:
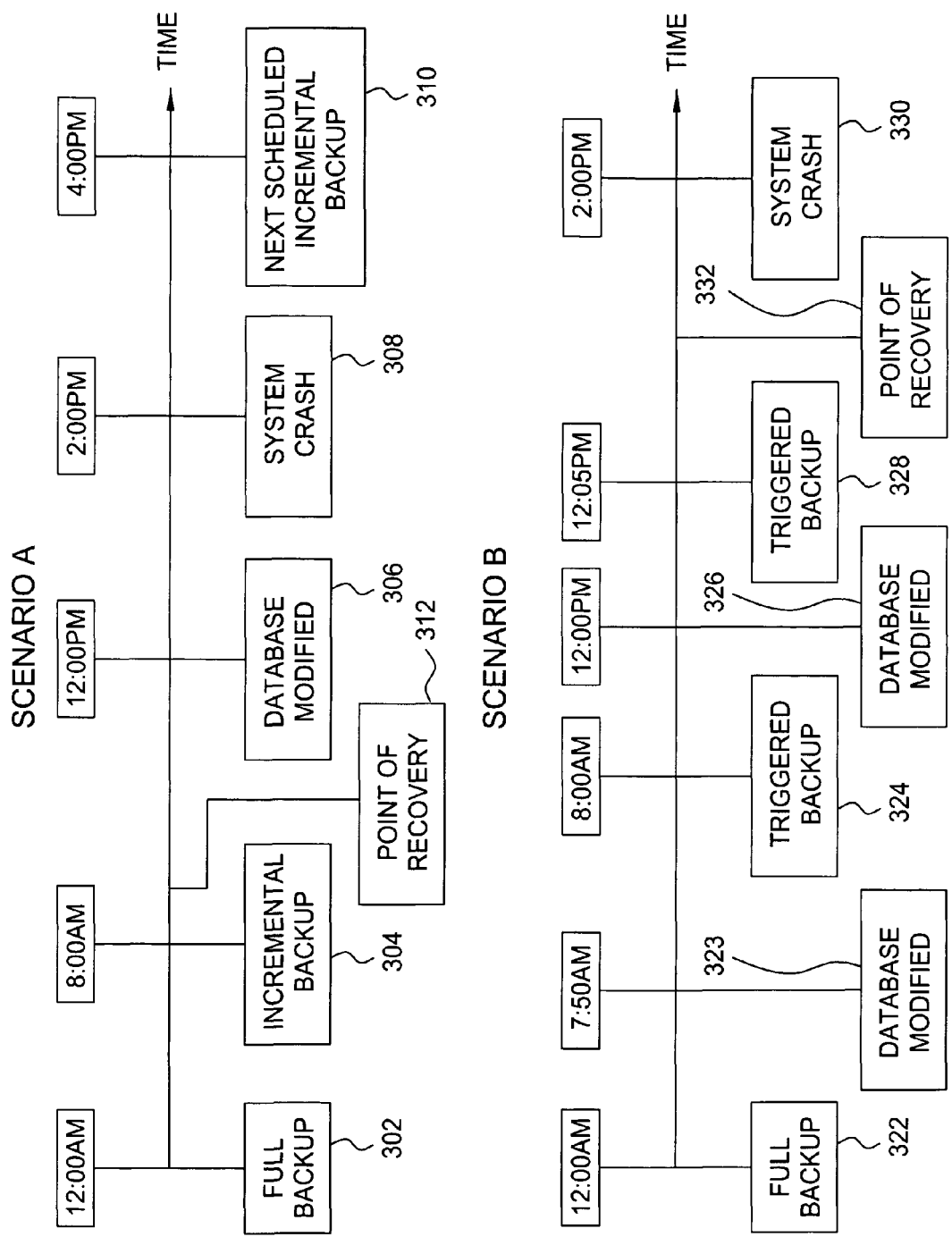
FIG. 3 depicts two scenario time lines comparing backup procedure execution and point of recovery for a timed system versus a system implemented in accordance with the present invention.

FIG. 3 depicts two timelines that illustrate the importance of a more dynamic point of recovery as provided by the present invention. More specifically, scenario A depicts a time dependent schedule for a series of periodic backup procedures as performed in prior art systems. Alternatively, scenario B depicts the dynamic backup process as performed by the present invention.

At event 302, scenario A indicates a full backup operation occurring at 12:00 AM midnight. The backup schedule in this scenario is configured to conduct a backup operation every 8 hours. Accordingly, at 8:00 AM an incremental backup procedure is executed at event 304. Event 306 depicts database files 140 in the SQL server 106 being modified at 12:00 PM noon. Subsequently, event 308 illustrates a system crash unexpectedly occurring at 2:00 PM, two hours prior to the next incremental backup operation scheduled to occur at 4:00 PM (i.e., event 310). According to this example, the latest point of recovery 312 can be positioned sometime after 8:00 AM when the second backup operation was completed. Consequently, in this scenario, any changes made to database files 140 at event 306 would be lost.

As mentioned above, scenario B depicts the dynamic backup process as performed by the present invention. The purpose of the invention is able to achieve a point of recovery closer in time to an unexpected system failure. This may be accomplished by conducting a backup procedure or snapshot of database files 140 after a period of high transactions. To illustrate this point, consider event 322 of scenario B, which indicates a full backup procedure occurring at 12:00 AM midnight. At event 323, the database files 140 are modified at 7:50 AM.

At event 324, a backup operation is triggered at 8:00 AM since the amount of data modified exceeded a predetermined threshold. At 12:00 PM noon, the database files 140 in the SQL server 106 are modified once again at event 326. Shortly after the database modification (e.g., 12:05 PM), a backup operation is triggered due to the amount of modified data exceeding a predetermined threshold at event 328. At event 330, a system crash unexpectedly occurs at 2:00 PM. However, the point of recovery can be positioned sometime after 12:05 PM when the triggered backup was completed (i.e., event 332). Since the backup operation was conducted shortly after the data was modified, the recent changes to the database files 140 were not lost. Thus, the advantage of a dynamic backup process is evident.

The present invention provides a method and apparatus for dynamically backing up database files. More specifically, this invention proactively backs up databases whenever the predetermined quantity of stored data is modified to a level that exceeds a threshold. Therefore, the invention is able to reduce a storage system's overall process load since the invention will not conduct redundant backup operations. By avoiding backup operations that are executed on a scheduled, periodic basis, backup operations may be conducted in a manner that affords a favorable point of recovery in the event a server failure occurs. Consequently, this invention is less vulnerable to unexpected system crashes.

While the foregoing is directed to embodiments of the present invention, other and further embodiments of the invention may be devised without departing from the basic scope thereof, and the scope thereof is determined by the claims that follow.

What is claimed is:

1. A method for backing up a storage system storing a database, comprising:
utilizing a volume snapshot service (VSS) to create a snapshot image file of said storage system, wherein
said snapshot image file includes a copy of said database created without invoking database activity, and
said snapshot image file contains a SQL bitmap;
reading data blocks of said copy of said database in said snapshot image file;
ascertaining a number of modified data blocks, wherein
said modified data blocks are said data blocks that have changed since a last backup operation,
said ascertaining comprises contrasting said SQL bitmap to an original bitmap to determine said number of said modified data blocks, and
said original bitmap represents data blocks from said last backup operation;
estimating a backup size from said number of said modified data blocks;
determining if said backup size exceeds a predetermined threshold at or below which no backup operation is to be conducted; and
conducting a backup operation in the event said predetermined threshold has been exceeded.

2. The method of claim 1, wherein said utilizing step can be executed according to a predetermined periodic schedule.

3. The method of claim 1, wherein said estimating step further comprises:
obtaining a sum of said number of said modified data blocks; and
multiplying said sum by a conversion factor to calculate a corresponding amount of data size.

4. The method of claim 3, wherein said conversion factor is 8192 bytes/block.

5. The method of claim 1, wherein said reading step further comprises reading said data blocks from said SQL bitmap.

6. The method of claim 1, wherein said data blocks are 8 kilobyte SQL blocks.

7. The method of claim 1, wherein said predetermined threshold is an adjustable threshold.

8. The method of claim 1, wherein said backup operation is a backup snapshot image.

9. The method of claim 1, wherein the step of conducting a backup operation in the event said predetermined threshold has been exceeded includes wherein the backup operation so conducted is otherwise unscheduled.

10. An apparatus for backing up a storage system in a computer where said storage system is storing a database, comprising:
means for utilizing a volume snapshot service (VSS) to create a snapshot image file of said storage system, wherein
said snapshot image file includes a copy of said database created without invoking database activity, and
said snapshot image file contains a SQL bitmap;
means for reading data blocks of said copy of said database in said snapshot image file;

means for ascertaining a number of modified data blocks, wherein
said modified data blocks are said data blocks that have changed since a last backup operation,
said ascertaining comprises contrasting said SQL bitmap to an original bitmap to determine said number of said modified data blocks, and
said original bitmap represents data blocks from said last backup operation;
means for estimating a backup size from said number of said modified data blocks;
means for determining if said backup size exceeds a predetermined threshold at or below which no backup operation is to be conducted; and
means for conducting a backup operation in the event said predetermined threshold has been exceeded.

11. The apparatus of claim 10, wherein said means for utilizing can be used to create said snapshot image file in accordance with a predetermined periodic schedule.

12. The apparatus of claim 10, wherein said means for estimating further comprises:
means for obtaining a sum of said number of said modified data blocks; and
means for multiplying said sum by a conversion factor to calculate a corresponding amount of data size.

13. The apparatus of claim 12, wherein said conversion factor is 8192 bytes/block.

14. The apparatus of claim 10, wherein said means for reading further comprises means for reading said data blocks from said SQL bitmap.

15. The apparatus of claim 10, wherein said data blocks are 8 kilobyte SQL blocks.

16. The apparatus of claim 10, wherein said predetermined threshold is an adjustable threshold.

17. The apparatus of claim 10, wherein said backup operation is a backup snapshot image.

18. The apparatus of claim 10, wherein the backup operation conducted in the event said predetermined threshold has been exceeded is otherwise unscheduled.

19. A non-transitory computer readable storage medium storing program instructions executable to:
utilize a volume snapshot service (VSS) to create a snapshot image file of said storage system, wherein
said snapshot image file includes a copy of said database created without invoking database activity, and
said snapshot image file contains a SQL bitmap;
read data blocks of said copy of said database in said snapshot image file;
ascertain a number of modified data blocks, wherein
said modified data blocks are said data blocks that have changed since a last backup operation,
ascertaining said number of modified data blocks comprises contrasting said SQL bitmap to an original bitmap to determine said number of said modified data blocks, and
said original bitmap represents data blocks from said last backup operation;
estimate a backup size from said number of said modified data blocks;
determine if said backup size exceeds a predetermined threshold at or below which no backup operation is to be conducted; and
conduct a backup operation in the event said predetermined threshold has been exceeded.

20. The non-transitory computer readable storage medium of claim 19, wherein said program instructions are further executable to:
obtain a sum of said number of said modified data blocks; and
multiply said sum by a conversion factor to calculate a corresponding amount of data size.

21. The non-transitory computer readable storage medium of claim 19, wherein said predetermined threshold is an adjustable threshold.

22. The non-transitory computer readable storage medium of claim 19, wherein said backup operation is a backup snapshot image.

* * * * *